April 25, 1939.  D. SCARAMUCCI  2,155,620

MEASURING LINE EQUIPMENT

Filed March 21, 1938

INVENTOR.
Domer Scaramucci.
BY Earl Babcock
ATTORNEY

Patented Apr. 25, 1939

2,155,620

UNITED STATES PATENT OFFICE 2,155,620

MEASURING LINE EQUIPMENT

Domer Scaramucci, Norman, Okla., assignor to Halliburton Oil Well Cementing Company, Duncan, Okla.

Application March 21, 1938, Serial No. 197,119

5 Claims. (Cl. 33—126.5)

This invention relates to measuring line equipment and more particularly to means and apparatus adapted to be used in oil wells to determine the location of a traveling body such as that used in the cementing of an oil well.

In the cementing of an oil well it is common practice to employ a measuring line which is provided with a weight which follows the plug so that the location of the batch of cement being pumped into the well can be determined at all times. This is disclosed in the patents to Halliburton, Nos. 1,369,891 (granted March 1, 1921) and 1,692,037 (granted November 20, 1928). Where the measuring line is used it is ordinarily not connected to the plug but the operator so controls the line that the weight hits the plug from time to time and by feeling of the line or watching the operation at the reel the position of the plug is determined.

In accordance with the present invention, it is proposed to provide means for latching the line to the plug, the latching means being such that it can be connected to the plug and disconnected therefrom any number of times. Each time the line is disconnected from the plug the latching means causes the line to jerk so that a sure way is provided for determining when the weight engages and disengages the plug. This is important, especially in deep wells or in crooked ones where it is difficult to determine contact between the weight and the plug by apparatus heretofore proposed.

Accordingly, it is one object of the invention to devise novel latching means between a weight adapted to be run on a measuring line and a plug or other object traveling in a well.

It is a further object of the invention to devise novel measuring line equipment for indicating the position of an object traveling in a well.

Other objects and advantages reside in certain novel features of the construction and arrangement of parts as will be apparent from the following description taken in connection with the accompanying drawing, in which.

Figure 1:
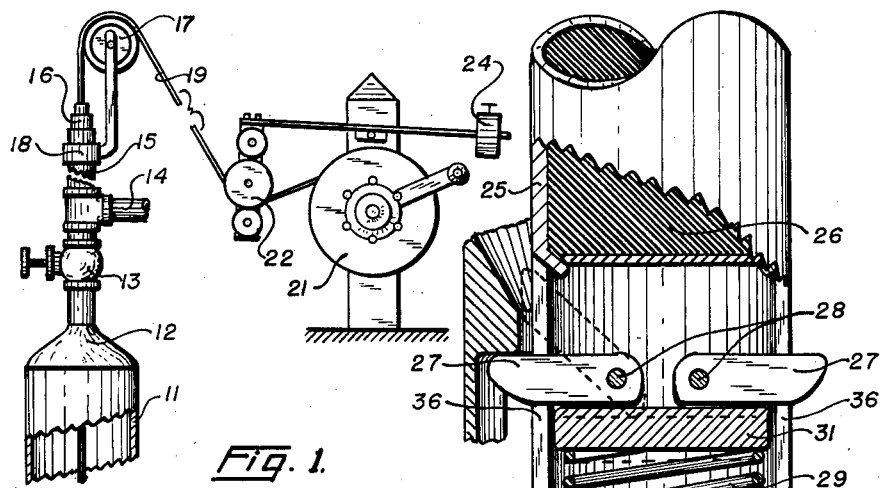
Figure 1 is a vertical cross-sectional view of sections of an oil well with measuring line equipment constructed in accordance with the present invention associated therewith.

Referring to the drawing in detail and first to the arrangement shown in Figure 1, it will be seen that the casing of an oil well is there illustrated at 11. At its upper end the well is provided with a swedge nipple 12 which is provided with a valve 13, a supply connection 14 and a pipe or staff 15, the upper end of which is provided with a stuffing box 16. A pulley 17 is swivelled on the staff 15 as shown at 18. A measuring line 19 which may consist merely of a high tensile strength wire passes through the assembly at the well head just described and is provided at its lower end with a weight 20. The measuring line passes from a reel 21 around a measuring wheel 22 and into the well after passing over the pulley 17.

The reel 21, measuring wheel 22 and the pulley 17 are preferably constructed as shown in the Halliburton Patent No. 1,692,037 mentioned above. As shown in that patent, the measuring wheel 22 is mounted on pivoted arms 23 and is counterbalanced by means of a weight 24. In this way the measuring wheel 22 is movable vertically and will swing upwardly if the line 19 is jerked.

Figure 2:
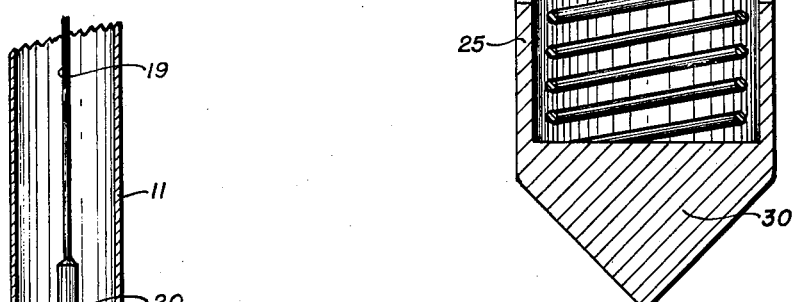
Figure 2 is a vertical cross-sectional view of the lower portion of the weight shown in the arrangement of Figure 1 together with a cross-sectional view of a fragment of the latching ring associated therewith.

Except for the weight 20, the apparatus just described is old and well known in the art. In accordance with the present invention the weight member 20 may consist of a steel cylinder such as is shown at 25 in Figure 2, the cylinder having its upper portion filled with a body of lead 26 to give it sufficient weight. The lower portion of the weight member 20 is provided with latching mechanism which may be of any convenient construction. In the arrangement illustrated two dogs or pawls 27 are provided and these normally extend horizontally and radially out of the weight member 20 being pivoted upon transversely extending shafts 28 as shown at Figure 2. The pawls 27 are maintained in position by means of a coil spring 29 which abuts against the closed lower end 30 of the weight member 20 and which acts upon a disc or block 31 which is thus pressed against the lower sides of the pawls 27. With this construction it will be seen that the pawls may be tilted both upwardly and downwardly. When tilted upwardly, as shown in the dotted line position in Figure 2, the coil spring 29 is compressed but slightly, whereas when the pawls are tilted downwardly the spring 29 is compressed a considerable distance, this result being attained due to the differences in the distances between the points of application of the force of the spring from the fulcrums of the pawls.

The weight member 20 just described cooperates with a special latching member carried by the traveling plug 32 as shown in Figure 1. The plug itself may be of the usual type used in the cementing of an oil well and consist of a wooden body member to which a number of rubber or other flexible discs are attached at the top and bottom. In accordance with the present invention a latching member 33 is connected to the top of the cementing plug as shown in Figure 1. The member 33 may be made of aluminum or other easily drillable material and consists essentially of a ring portion 34 provided with a guiding flange 35 and with two or more depending arms or brackets which provide means for bolting or otherwise securing it to the plug. Due to the fact that the ring 34 is positioned some distance above the plug 32 the weight member 20 may pass freely through the ring and any sediment or other obstruction beneath the ring 34 but above the plug may be forced out of this space between the brackets 33.

The lower edge of the latch ring 34 has a horizontal surface so that when the lower end of the weight member 20 is passed therethrough the pawls 27 may engage this ring as shown in Figure 2. As the weight member is lowered into the ring 34 the pawls 27 will be tilted upwardly into the dotted line position shown in Figure 2 and as soon as the pawls pass beneath the ring they will snap outwardly into the latching position. The spring 29 is so designed that the weight of the weight member 20 is sufficient to cause it to enter into latching engagement with the ring 34 by releasing the brake on the drum 21 sufficiently to allow the weight member 20 to drop a slight distance. In order to pull the weight member 20 loose from the latch ring 34 and the plug 32, considerable tension must be taken in the measuring line due to the fact that the spring 29 must be compressed some distance as mentioned above. This is accomplished by merely applying the brake on the drum 21 so that the weight can no longer move downwardly. As the plug 32 moves downwardly as the result of the forcing of fluid into the well above the plug, such as may be accomplished by a pump connected to the supply pipe 14, the parts take the position shown in Figure 3 and then take the position shown in Figure 4 at which time the weight member 20 snaps loose from the plug after first jerking the line and this causes the measuring wheel 22 to bob up and down or if the operator has his hand upon the measuring line 19 at a point between the measuring wheel 22 and the pulley 17, he can readily detect the time when the weight member 20 is disconnected from the plug 32.

Figure 3:
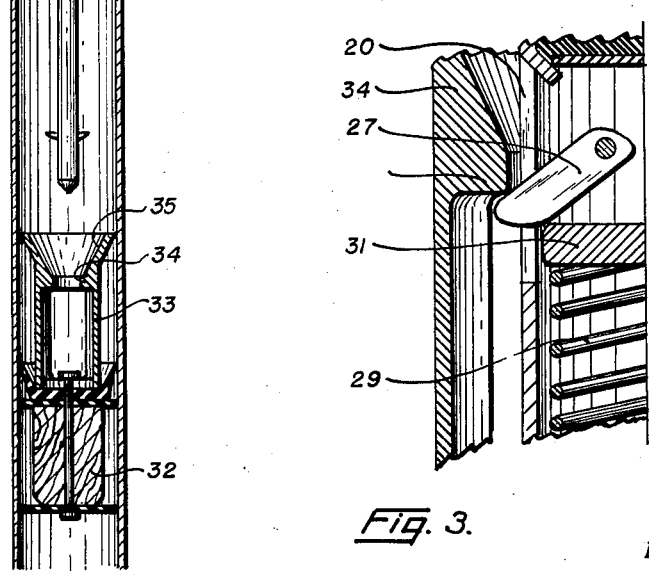
Figure 3 is a view in quarter section of a fragment of the apparatus shown in Figure 2 and illustrating the position of the parts just prior to the release of the weight from the plug.
Figure 4:
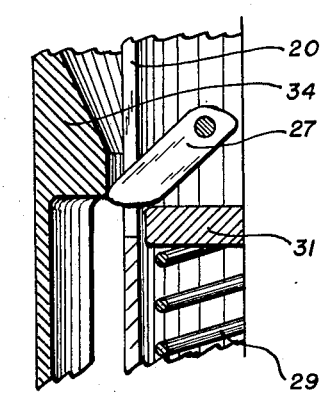
Figure 4 is a view in quarter section of a fragment of the apparatus shown in Figure 2, the parts being shown in the position which they occupy just as the weight is released from the plug.

It will be seen from an inspection of Figures 3 and 4 that as the plug 32 moves downwardly with respect to the weight member 20 the pawls 27 will be tilted downwardly and forced inwardly thus moving the block 31 downwardly and compressing the spring 29. As soon as the weight member 20 has been disconnected from the latch ring 34 the pawls 27 will be again forced outwardly to assume their natural horizontal position as shown in full lines in Figure 2.

The lower portion of the weight member 20 which houses the coil spring 29 and the block 31 is open to the pressure of the mud or other fluid which may exist in the well due to the fact that the pawls 27 extend through slots 36 in the well 25 of the weight member 20. Due to the fact that some cement may accidentally find its way into this chamber it should be washed after each time it is used.

With the arrangement described, it will be apparent that the weight member 20 may be connected and disconnected from the plug 32 any number of times as the plug is caused to move downwardly in the well. Each time the member 20 is disconnected from the plug it imparts a jerk to the line, the extent of the jerk depending on the strength of the spring 29 (which of course may be designed to have various strengths). The jerks in the line are readily determinable at the measuring wheel, in the arrangement shown, due to the fact that the measuring wheel will bob each time the line is jerked. Means is thus provided for readily indicating the position of the weight with respect to the plug at all times.

It is within the purview of the invention to use the plug and weight assembly shown herein with other types of reels and measuring devices. Instead of or in addition to the measuring wheel assembly shown, a weight indicator may be employed to indicate the jerking of the line. Apparatus of the type shown in the application of Bolton and Weiler, Serial No. 183,758 filed January 7, 1938, would be particularly advantageous in this connection, especially with a pressure gage connected to the flexible conduit 60 thereof, to indicate the tension in the measuring line.

The invention may of course be carried out in a wide variety of ways and various arrangements other than those shown may be employed without departing from the spirit of the invention or the scope of the annexed claims.

I claim:

1. In measuring line equipment adapted for use in oil wells or the like, the combination of a body adapted to be moved through the well, a measuring line, a reel upon which the line may be wound, a pulley adapted to be mounted at the well head for feeding the line into the well, a pivoted member riding on the line between the reel and the pulley, a counterbalance for said pivoted member, a weight member connected to the lower end of the measuring line and supported thereby above said body and latching means for repeatedly connecting and disconnecting said weight member to said body as said body is moved downwardly through the well, said latching means including cooperating devices, one carried by said body and another carried by said weight member adapted to connect the same when said weight member is dropped into engagement with said body and resilient yieldable means permitting the weight member to separate from said body upon forced relative movement therebetween, the arrangement being such that a jerk is imparted to the line upon separation of said members thereby causing movement of said pivoted member to indicate the position of said weight member with respect to said body.

2. In measuring line equipment adapted for use in oil wells or the like, the combination of a body adapted to be moved through the well, a measuring line, a weight member connected to the lower end of said measuring line so as to be suspended thereby above said body and means for repeatedly latching said weight member to said body by merely dropping the weight member into engagement with said body, said latching means having a spring associated therewith adapted to yield upon a predetermined pressure being exerted thereon by said latching means to permit the latching means to trip and the weight member to be disengaged from said body and again latched thereto.

3. In measuring line equipment adapted for use in oil wells or the like, the combination of a body adapted to be moved through the well, a measuring line, a weight member connected to the lower end of said measuring line so as to be suspended thereby above said body and latching means associated with said weight member and body for connecting the same together upon the weight member being dropped into contact with said body, said latching means having a spring adapted to yield upon relative movement between the body and weight member and permit the separation of said weight member from said body after causing the measuring line to jerk.

4. In measuring line equipment adapted for use in oil wells or the like, the combination of a body adapted to be moved downwardly through the well, a measuring line, a reel upon which the line may be wound, a pulley adapted to be mounted at the well head for feeding the line into the well, means associated with said line at the surface of the well for indicating a jerk in the line, a weight member connected to the lower end of the line for supporting the same above said body and means associated with said weight member and said body for imparting a series of jerks to the line as the weight body is repeatedly dropped into engagement with said body and then held against downward movement therewith, thereby enabling an operator to determine from movement of said indicating means whether or not the weight member is in close proximity with said body.

5. Apparatus for use in an oil well or the like, comprising the combination with a measuring line of a weight member connected to the lower end thereof, a body adapted to move through the well below said weight member and latching means associated with said weight member and body for connecting the same together upon contact therebetween, said latching means having a spring adapted to yield upon forced relative movement between said member and said body when connected together and trip the latching means, said latching means being further characterized by the fact that when tripped the parts take a position enabling them to again connect the member to the body when and if the same are again brought into contact.

D. SCARAMUCCI.